US 7,349,901 B2

(12) United States Patent
Ramarathnam et al.

(10) Patent No.: US 7,349,901 B2
(45) Date of Patent: Mar. 25, 2008

(54) SEARCH ENGINE SPAM DETECTION USING EXTERNAL DATA

(75) Inventors: Bama Ramarathnam, Sammamish, WA (US); Eric B. Watson, Redmond, WA (US); Janine Ruth Crumb, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 619 days.

(21) Appl. No.: 10/850,623

(22) Filed: May 21, 2004

(65) Prior Publication Data

US 2006/0004748 A1 Jan. 5, 2006

(51) Int. Cl.
G06F 17/30 (2006.01)
(52) U.S. Cl. .............................. 707/6; 707/5; 713/151
(58) Field of Classification Search ...................... None
See application file for complete search history.

(56) References Cited

U.S. PATENT DOCUMENTS

| | | | |
|---|---|---|---|
| 5,911,043 A | 6/1999 | Duffy et al. | |
| 6,256,623 B1 | 7/2001 | Jones | |
| 6,473,753 B1 | 10/2002 | Katariya et al. | |
| 6,526,440 B1 | 2/2003 | Bharat | |
| 6,529,903 B2 | 3/2003 | Smith et al. | |
| 6,549,897 B1 | 4/2003 | Katariya et al. | |
| 6,615,209 B1 | 9/2003 | Gomes et al. | |
| 6,654,742 B1 | 11/2003 | Kobayashi et al. | |
| 6,658,423 B1 | 12/2003 | Pugh et al. | |
| 6,678,681 B1 | 1/2004 | Brin | |
| 6,701,314 B1 | 3/2004 | Conover et al. | |
| 2002/0123988 A1 | 9/2002 | Dean et al. | |
| 2002/0133481 A1 | 9/2002 | Smith et al. | |
| 2002/0199095 A1* | 12/2002 | Bandini et al. ............. | 713/151 |
| 2003/0037074 A1* | 2/2003 | Dwork et al. ................ | 707/500 |
| 2003/0212649 A1 | 11/2003 | Denesuk et al. | |
| 2003/0212675 A1 | 11/2003 | Denesuk et al. | |

(Continued)

FOREIGN PATENT DOCUMENTS

WO   WO 01/46870 A1   6/2001

(Continued)

OTHER PUBLICATIONS

Dwork et al., "Rank Aggregation Methods for the Web," Proceedings of the Tenth International Conference on World Wide Web, 2001, pp. 613-622, ACM Press, New York, U.S.A.

(Continued)

*Primary Examiner*—Charles Rones
*Assistant Examiner*—Belix M Ortiz
(74) *Attorney, Agent, or Firm*—Senniger Powers

(57) ABSTRACT

Evaluating an electronic document in connection with a search. An external source provides data for use in evaluating an electronic document retrieved by a search engine. A first confidence level of the electronic document is determined based on the externally provided data. The first confidence level indicates a likelihood that the electronic document is undesirable. A second confidence level of the electronic document is determined based on attributes of the electronic document. The second confidence level indicates a likelihood that the electronic document is unsatisfactory with respect to a search. A rating for the electronic document generated as a function of the determined first confidence level and the determined second confidence level is used to categorize the electronic document as unsatisfactory in connection with a received search request.

25 Claims, 8 Drawing Sheets

U.S. PATENT DOCUMENTS

| | | |
|---|---|---|
| 2003/0212699 A1 | 11/2003 | Denesuk et al. |
| 2003/0229672 A1 | 12/2003 | Kohn |
| 2004/0024823 A1 | 2/2004 | Del Monte |
| 2004/0049514 A1 | 3/2004 | Burkov |
| 2004/0093384 A1 | 5/2004 | Shipp |
| 2005/0240618 A1 | 10/2005 | Nickerson et al. |

FOREIGN PATENT DOCUMENTS

| | | | |
|---|---|---|---|
| WO | WO 01/55905 A1 | 8/2001 | |
| WO | WO 02/41190 A2 | 5/2002 | |

OTHER PUBLICATIONS

Lempel, et al., "SALSA: The Stochastic Approach for Link-Structure Analysis," ACM Transactions on Information Systems (TOIS), Apr. 2001, pp. 131-160, vol. 19, Issue 2, ACM Press, New York, U.S.A.

Brin et al., "The Anatomy of a Large-Scale Hypertextual Web Search Engine," Aug. 7, 2000, pp. 1-18.

* cited by examiner

SEARCH ENGINE SPAM DETECTION USING EXTERNAL DATA

TECHNICAL FIELD

Embodiments of the present invention relate to the field of searching for relevant data entities using a communications network. In particular, embodiments of the invention relate to using external data to prevent a deliberate manipulation by a creator of an electronic document to mislead a search engine into giving an undeservedly high rank to the electronic document.

BACKGROUND OF THE INVENTION

The Internet has vast amounts of information distributed over a multitude of computers, hence providing users with large amounts of information on various topics. This is also true for a number of other communication networks, such as intranets and extranets. Although large amounts of information may be available on a network, finding the desired information is usually not easy or fast.

Search engines have been developed to address the problem of finding desired information on a network. Typically, a user who has an idea of the type of information desired enters one or more search terms to a search engine. The search engine then returns a list of network locations (e.g., uniform resource locators (URLs)) that the search engine has determined to include an electronic document relating to the user-specified search terms. Many search engines also provide a relevance ranking. A typical relevance ranking is a relative estimate of the likelihood that an electronic document at a given network location is related to the user-specified search terms in comparison to other electronic documents. For example, a conventional search engine may provide a relevance ranking based on the number of times a particular search term appears in an electronic document, its placement in the electronic document (e.g., a term appearing in the title is often deemed more important than if appearing at the end of the electronic document). In addition, link analysis has also become a powerful technique in ranking web pages and other hyperlinked documents. Anchor-text analysis, web page structure analysis, the use of a key term listing, and the URL text are other techniques used to provide a relevance ranking.

Creators of electronic documents often complicate the problem of relevance ranking through deliberate efforts to present their electronic documents to a user. For example, some creators attempt to induce a search engine to generate higher rank figures for their electronic documents than may otherwise be warranted. Deliberate manipulation of an electronic document by its creator in an attempt to achieve an undeservedly high rank from a search engine is generally referred to as search engine spamming. The goal of a search engine spam is to deceitfully induce a user to visit a manipulated electronic document. One form of manipulation includes putting hundreds of key terms in an electronic document (e.g., in meta tags of the electronic document) or utilizing other techniques to confuse a search engine into overestimating (or even incorrectly identifying) the relevance of the electronic document with respect to one or more search terms. For example, a creator of a classified advertising web page for automobiles may fill the "key term" section with repetitions of the term "car." The creator does this so that a search engine will identify that web page as being more relevant whenever a user searches for the term "car." But a "key term" section that more accurately represents the subject matter of the web page may include the terms "automobile," "car," "classified," and "for sale."

Some other techniques to create search engine spam include returning a different electronic document to a search engine than to an actual user (i.e., a cloaking technique), targeting a key term unrelated to an electronic document, putting a key term in an area where a user will not see it to increase key term count, putting a link in an area where a user will not see it to increase link popularity, producing a low-quality doorway web page, deceitfully redirecting a user from a highly ranked electronic document to an irrelevant electronic document to present the irrelevant electronic document to the user, and so on. The result is that a search engine provides a user who runs a query a highly ranked electronic document that may not be truly relevant. Thus, the search engine does not protect the user against such deliberate ranking manipulation.

Existing search engines attempt to prevent search engine spam by separately analyzing each spam technique to identify a pattern of a manipulated electronic document. When such search engines detect an electronic document that has the identified pattern, then the search engines label the electronic document as spam to avoid presenting the electronic document to a user in a search result or to demote the result. For example, a particular search engine may label an electronic document that is primarily built for the search engine rather than for an end-user as a search engine spam. Similarly, a search engine may detect a hidden text and/or a hidden link in an electronic document and label this electronic document as a search engine spam. Some search engines may also detect a web site that has numerous unnecessary host names (e.g., poker.foo.com, blackjack.foo-.com, etc.) or with excessive cross-links used to artificially inflate the web site's apparent popularity and label this web site as a search engine spam. Moreover, existing search engines may detect a web site that employs a cloaking technique or link farming by which the web site exchange a reciprocal link with another web site to increase search engine optimization.

In contrast to a search engine spam, an electronic mail (or e-mail) spam is an unsolicited e-mail message usually sent to many recipients at a time. An e-mail spam is the electronic equivalent of a junk mail. In most cases, the content of an e-mail spam message is not relevant to the interests of the recipient. Thus, creating an e-mail spam is an abuse of the Internet to distribute a message to a huge number of people at a minimal cost.

An e-mail spam is distinguished from a search engine spam in a number of ways. For example, a program may automatically generate an e-mail message for sending an e-mail spam to a large number of recipients. In contrast, a search engine spam does not involve an e-mail address, a sender, or a recipient. But a search engine spam nonetheless shares certain characteristics with an e-mail spam. For example, both search engine spam and e-mail spam are undesirable in that they are both created to deceitfully induce a user to visit a particular product or service. Accordingly, more often than not, a creator of an e-mail spam may also generate a search engine spam to increase the exposure of one or more electronic documents relating to a product or service. That is, spammers often rely on both e-mail spam and search engine spam to market a product or service. As such, there is generally a strong correlation between e-mail spam and search engine spam. Nevertheless, prior art systems and methods have overlooked such a correlation between the possible sources of e-mail spam and search engine spam. Specifically, the prior art treats e-mail spam and search engine spam as separate problems requiring entirely different solutions.

Accordingly, a solution that effectively identifies and prevents search engine spam is desired.

SUMMARY OF THE INVENTION

Embodiments of the invention overcome one or more deficiencies in the prior art by providing, among other things, use of an external source to detect potentially undesirable electronic documents in connection with a search and, thus, provide better search engine results. According to one embodiment of the invention, an e-mail spam detection system identifies an e-mail message as a likely e-mail spam. A memory area such as a database then stores a list of links included in this e-mail message. An embodiment of the invention accesses this database and determines a confidence level for an electronic document provided by a link stored in the database. The confidence level of the electronic document indicates a likelihood that the electronic document is a search engine spam. In another embodiment, the invention identifies a network address where a likely e-mail spam originates from. The database then stores this network address. By accessing the database, embodiments of the invention can determine a confidence level for an electronic document located at this network address and, thus, better identify search engine spam. Moreover, the e-mail spam detection system may identify a list of terms (e.g., words, combinations of words, phrases, strings, n-grams, binary data, etc.) that frequently appear in an e-mail spam. The database then stores this list of terms. One embodiment of the invention thus produces a confidence level for an electronic document with respect to search engine spam that includes one or more of the stored e-mail spam terms to indicate a likelihood that the electronic document is a search engine spam. If an electronic document has a high confidence level of being a search engine spam, then embodiments of the invention may demote this electronic document in a search result provided to a user. Alternatively, embodiments of the invention may remove this electronic document from the provided search result.

According to one or more other embodiments, the invention allows a user to provide information as to the desirability of an electronic document. The user may provide this information in response to an e-mail spam or a search engine spam. If the user-provided information characterizes the electronic document as undesirable, embodiments of the invention then identify one or more attributes of the electronic document to generate a rating for the electronic document. If the electronic document has a high rating, then it has a high likelihood of being a search engine spam. Accordingly, embodiments of the invention may adjust the ranking of the electronic document in a search result to provide an accurate relevance ranking to a user. Moreover, the features of embodiments of the present invention described herein are economically feasible, commercially practical, and easier to implement than currently available techniques.

Briefly described, a method employing aspects of the invention evaluates an electronic document in connection with a search. The method includes determining a first confidence level of an electronic document. The electronic document is retrievable by a search engine in response to a search request from a user. The first confidence level indicates a likelihood that the electronic document is undesirable based on information provided by a source external to the search engine. The method also includes determining a second confidence level of the electronic document. The second confidence level indicates a likelihood that the electronic document is unsatisfactory with respect to the search request based on one or more attributes of the electronic document. The method further includes generating a rating for the electronic document as a function of the determined first confidence level and the determined second confidence level. The method also includes designating the electronic document as unsatisfactory in connection with the search request based on the generated rating of the electronic document.

In another embodiment of the invention, a method employing aspects of the invention evaluates an electronic document in connection with a search. The method includes receiving user-provided information with respect to an electronic document. The electronic document is retrievable by a search engine in response to a search request from a user. The user-provided information characterizes the electronic document as undesirable. The method also includes generating a rating for the electronic document as a function of the received user-provided information. The method further includes designating the electronic document as unsatisfactory in connection with the search request according to the generated rating of the electronic document.

In yet another embodiment of the invention, a system employing aspects of the invention evaluates an electronic document in connection with a search. The system includes a processor for receiving a search request from a user and for identifying an electronic document based on the received search request. The system also includes a memory area storing data provided by a source external to the processor for use in evaluating whether the electronic document is undesirable. The processor is configured to determine a first confidence level of the electronic document. The first confidence level indicates a likelihood that the electronic document is undesirable based on the data provided by the external source. The processor is also configured to establish a second confidence level of the electronic document. The second confidence level indicates a likelihood that the electronic document is unsatisfactory with respect to a search based on one or more attributes of the electronic document. The processor is further configured to generate a rating for the electronic document as a function of the determined first confidence level and the established second confidence level and to categorize the electronic document as unsatisfactory in connection with the received search request based on the generated rating of the electronic document.

In further yet another embodiment of the invention, computer-readable media employing aspects of the invention have computer-executable components for evaluating an electronic document in connection with a search. The computer-readable media include an interface component for receiving user-provided information with respect to an electronic document. The electronic document is retrievable in response to a search request from a user. The user-provided information characterizes the electronic document as undesirable. The computer-readable media also include an analyzing component for generating a rating for the electronic document as a function of the received user-provided information. The computer-readable media further include a query component for categorizing the electronic document as unsatisfactory in connection with the search request according to the generated rating of the electronic document.

In further yet another embodiment of the invention, computer-readable media employing aspects of the invention have computer-executable components for evaluating an electronic document in connection with a search. The computer-readable media include a query component to receive a search request from a user and to identify an electronic document based on the received search request. The computer-readable media also include an external component to provide data for use in evaluating whether the electronic document is undesirable. The computer-readable media further include an internal component to determine a first confidence level of the electronic document. The first confidence level indicates a likelihood that the electronic document is undesirable based on the data provided by the external component. The internal component is further configured to establish a second confidence level of the electronic document. The second confidence level indicates a likelihood that the electronic document is unsatisfactory with respect to a search based on one or more attributes of the electronic document. The computer-readable media also include an analyzing component to generate a rating for the electronic document as a function of the determined first confidence level and the established second confidence level. The query component is configured to classify the electronic document as unsatisfactory in connection with the received search request based on the generated rating of the electronic document.

Computer-readable media having computer-executable instructions for performing methods of detecting an unsatisfactory electronic document in connection with a search embody further aspects of the invention.

Alternatively, embodiments of the invention may comprise various other methods and apparatuses.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE INVENTION

Exemplary Network Environment for Detecting an Undesired Electronic Document

Figure 1:
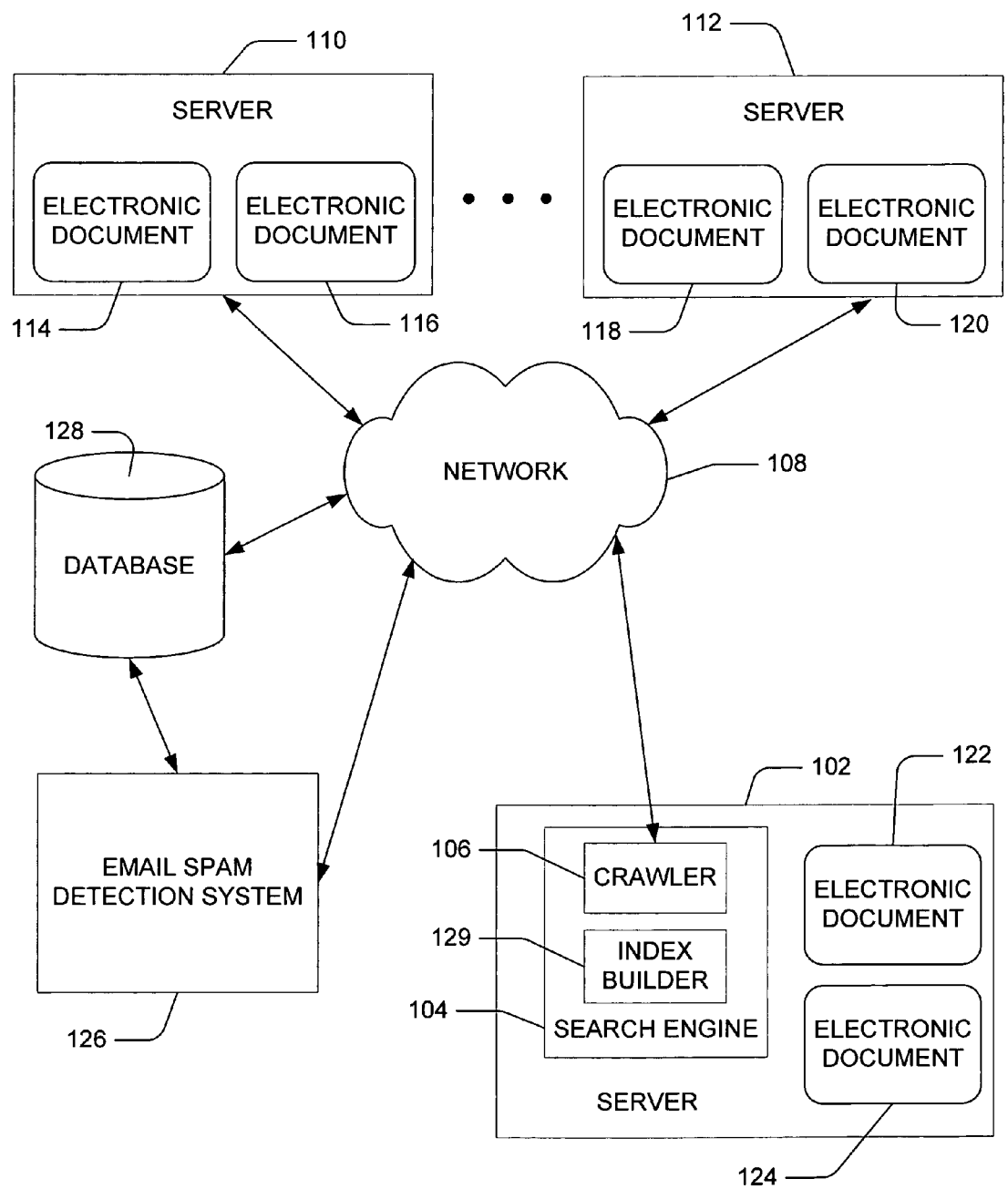
FIG. 1 is a block diagram illustrating an exemplary network environment in which embodiments of the present invention may be utilized.

Referring first to FIG. 1, a block diagram illustrates one example of a suitable network environment in which embodiments of the invention may be utilized. A server computer 102 includes a processor such as a search engine 104. The search engine 104 further includes a crawler 106. The crawler 106 searches for electronic documents distributed on one or more computers connected to a communications network 108, such as a remote server computer 110 and a remote server computer 112 illustrated in FIG. 1. Communications network 108 may be a local area network such as an intranet, a wide area network such as the Internet, or a combination of networks that allow the server computer 102 to communicate with remote computers such as the server computers 110 and 112, either directly or indirectly.

Crawler 106 searches server computers 110 and 112 connected to network 108 and finds electronic documents 114 and 116 stored on server computer 110 and electronic documents 118 and 120 stored on server computer 112. The electronic documents stored on the remote server computers may include web pages (e.g., hypertext markup language (HTML) pages and XML pages) and multimedia files. Crawler 106 receives these electronic documents and associated data. Further, server computer 102 may include electronic documents 122 and 124 that are accessed by crawler 106.

As illustrated in FIG. 1, an e-mail spam detection system 126, which constitutes a source external to search engine 104, is also connected to network 108. The e-mail spam detection system 126 is a system that detects an e-mail spam delivered to a user of system 126. Specifically, one or more remote computers such as server 110 and/or server 112 may generate and send an e-mail message to a user of system 126. E-mail spam detection system 126 then detects that a particular e-mail message may be an e-mail spam and performs an action to protect its user. For example, system 126 may block out a detected e-mail spam from a user's mailbox or may warn a user that a particular e-mail message may be an e-mail spam. Alternatively, system 126 may deliver an e-mail message to a responsible user for confirmation that it is not an e-mail spam before delivering the message to its recipient.

E-mail spam detection system 126 may utilize several techniques to detect an e-mail spam. In one technique, system 126 includes a probabilistic classifier trained to identify a pattern of an e-mail spam. The probabilistic classifier includes computer-executable instructions to categorize an e-mail message. In general, the probabilistic classifier identifies combinations of attributes that are statistically significant in an e-mail spam (e.g., statistically significant key terms and/or contextual information). Unsolicited e-mail messages often include some commonly shared attributes. Examples of such commonly shared and thus statistically significant attributes include key terms that describe an unrealistic offer of product or service (e.g., free medicine, weight loss programs, or applications for credit cards). Moreover, such attributes may include an e-mail address determined to have sent an e-mail spam. Specifically, the probabilistic classifier may be trained to identify the domain names of one or more creators of e-mail spam (e.g., based on the "From:" line of the e-mail spam). The probabilistic classifier may then parse the "From:" line of an e-mail message to determine if a sender of the e-mail message corresponds to a known creator of e-mail spam.

Similarly, the probabilistic classifier may be trained to recognize a network address from which an e-mail spam originates from. E-mail spammers often arbitrarily set the "From:" line or other information of an e-mail spam to any value. But it is difficult to conceal the originating network address (e.g., Internet protocol (IP) address) of the e-mail spam. The network address of the incoming simple mail transfer protocol (SMTP) connection is thus a valuable attribute to train the probabilistic classifier to characterize an e-mail spam. In addition, the probabilistic classifier may be trained to identify one or more links or URLs associated with an e-mail spam. That is, URLs included in a likely e-mail spam are specifically parsed to generate attributes that characterize an e-mail spam. Many e-mail messages include embedded URLs. The presence of these URLs may indicate that these e-mail messages are e-mail spam. For example, these URLs may direct an e-mail recipient to one or more web pages that offer an unsolicited product or service. In one embodiment, host names (e.g., alphabetical, dotted decimal, hexadecimal, or octal encoded host names) are extracted from these URLs to assist characterizing an e-mail spam. Thus, if a combined URL is of the form <URL1>@<URL2>@ . . . @<URLn>, then the URL after the last @ sign (i.e., URLn) is the host name to be extracted.

An e-mail spammer may include a redirector in a URL to avoid a host name relating to the spammer from being extracted by the probabilistic classifier. This redirector is included in the URL to redirect the e-mail recipient to a web site affiliated with the e-mail spammer. In such a scenario, the probabilistic classifier is configured to identify a real host name hidden in a redirect URL and use this real host name as an attribute that characterizes an e-mail spam.

As discussed, the probabilistic classifier is trained on a likely e-mail spam to recognize one or more attributes of the e-mail spam. E-mail spam detection system 126 may employ several techniques to identify a potential e-mail spam for training the probabilistic classifier. In one technique, an e-mail recipient may indicate whether a particular e-mail message is an e-mail spam. In another technique, system 126 maintains a honeypot to capture an e-mail spam. A honeypot represents an e-mail account that has never existed or has been terminated for a given period. But to an e-mail spammer, a honeypot generally appears to be a regular e-mail account. Thus, an e-mail message sent to a honeypot may be considered an e-mail spam, given that the e-mail account represented by the honeypot never existed or has been terminated for a period, thus leaving no reason for the e-mail account to receive a legitimate e-mail.

In yet another technique to identify a potential e-mail spam for training the probabilistic classifier, e-mail spam detection system 126 may implement a challenge response against an incoming e-mail. That is, system 126 may request a sender of an incoming e-mail to solve a challenge to confirm that the e-mail is not machine generated. If the sender fails to solve the challenge, then system 126 may identify the e-mail as a possible e-mail spam for the probabilistic classifier to extract its attributes.

A wide variety of training techniques may be utilized to train the probabilistic classifier. E-mails identified as spam and e-mails identified as non-spam are fed into computer-executable training instructions. The computer-executable training instructions then recognize attributes that are present in e-mails identified as spam but not in e-mails identified as non-spam. Accordingly, the recognized attributes are classified as statistically significant in an e-mail spam. The computer-executable training instructions may further determine a weight for each attribute classified as statistically significant. The training instructions determine the weight for a given attribute based on a number of factors, including how frequently the attribute appears in an e-mail spam. The computer-executable training instructions may be implemented as a number of different architectures. For example, the computer-executable training instructions may be implemented as a Naïve Bayesian classifier, a limited dependence Bayesian classifier, a Bayesian network classifier, a decision tree, a support vector machine, a content matching classifier, a maximum entropy classifier, a combination thereof, and so on.

In addition, the probabilistic classifier of system 126 may be trained by pattern recognition to identify combinations of statistically significant attributes that may not be identified by key term matching techniques. In particular, the statistical techniques used by pattern recognition to train the probabilistic classifier may generalize attributes based on training samples such that the probabilistic classifier may be able to recognize variations of a given attribute. For example, the probabilistic classifier may be able to recognize a slangy phrase such as "free stereo pl@yer" as relating to an e-mail spam. In contrast, the key term matching techniques may not be able to effectively identify such slang or other phrase variations. Nonetheless, it is understood that key term matching may be utilized contemporaneously with pattern recognition to train the probabilistic classifier.

Based on its analysis of attributes extracted from an e-mail message, the probabilistic classifier generates a rating for the e-mail message. For instance, the probabilistic classifier may assign absolute weights to individual attributes (e.g., terms, network addresses, host names, etc.) identified in an e-mail message. As discussed above, the weight for a given attribute is determined during the training process of the probabilistic classifier. The probabilistic classifier then generates a rating for the e-mail message by applying the assigned weights to a mathematical function (e.g., summing the weights). In one embodiment, the rating of an e-mail message may be in the form of a percentage (e.g., 60%). And the higher the rating of an e-mail message, the higher the likelihood that the e-mail message is an e-mail spam. That is, the rating of an e-mail message indicates a likelihood that the e-mail message includes elements that are likely to appear in an e-mail spam. In another embodiment, the probabilistic classifier generates a rating for an e-mail message based on a frequency that a particular attribute appears in the e-mail message as well as a combination of attributes existing in the e-mail message. Specifically, an attribute that by itself may not be indicative of an e-mail spam may serve as contextual or aggregating information that an e-mail message constitutes an e-mail spam. For example, the attribute "credit card" alone may not suggest that an e-mail message is an e-mail spam. However, the attribute "credit card" in combination with the attribute "no annual fee" may suggest that the e-mail message constitutes an unsolicited offer and accordingly an e-mail spam.

The probabilistic classifier further categorizes the e-mail message as a function of the generated rating. That is, after the probabilistic classifier generates a rating for an e-mail message, it determines if the e-mail message constitutes an e-mail spam based on the rating. For example, e-mail spam detection system 126 may have stored thereon a threshold level (e.g., 70%), which represents a predetermined likelihood that an e-mail message is undesirable. The probabilistic classifier then compares the rating of the e-mail message to the threshold level. In one embodiment, if the rating of the e-mail message is greater than (or greater than or equal to) the threshold level, then the probabilistic classifier categorizes the e-mail message as an e-mail spam. It is noted that an administrator may change the sensitivity of e-mail spam detection system 126 by changing the threshold level. For example, the administrator may set a higher threshold level so that fewer e-mail messages are categorized as e-mail spam.

If an e-mail message is categorized as a likely e-mail spam, then system 126 extracts certain attributes associated with the e-mail message for storage in a memory area such as a database 128 connected to network 108. According to one embodiment of the invention, system 126 identifies one or more network addresses (e.g., IP addresses) associated with the e-mail message. For instance, system 126 may identify an originating network address of the e-mail message. Thus, if the e-mail message originates from server 110, system 126 stores the network address of server 110 in the database 128. According to another embodiment of the invention, system 126 further identifies one or more links included in an e-mail message categorized as an e-mail spam. System 126 then stores host names of the identified links in database 128. Thus, if an e-mail message categorized as an e-mail spam includes a URL of electronic document 114, then system 126 stores a host name of this URL in database 128. Additionally, system 126 identifies a list of terms (e.g., words, combinations of words, phrases, strings, n-grams, binary data, etc.) associated with an e-mail spam. System 126 also stores this list of terms in database 128.

For each network address, host name, or term stored in database 128, system 126 further specifies a confidence level that this network address, host name, or term is associated with an e-mail spam. System 126 may specify the confidence level based on a rating of the e-mail message that includes the network address, host name, or term. Accordingly, if the probabilistic classifier generates a rating of 80% for a particular e-mail message, then it specifies a confidence level of 80% for a network address, host name, and/or term identified from this e-mail message. The specified confidence level for the network address, host name, and/or term is similarly stored in database 128.

When crawler 106 of search engine 104 navigates network 108 to collect one or more electronic documents located on network 108 and an index builder 129 of search engine 104 parses the collected electronic documents to identify their characteristics for indexing, search engine 104 will establish another confidence level for a collected electronic document to indicate a likelihood that this collected electronic document is a search engine spam (i.e., unsatisfactory with respect to a search). Particularly, crawler 106 will identify one or more patterns of the collected electronic document to determine if these patterns correspond to a pattern characterizing a search engine spam. For example, crawler 106 may identify if the collected electronic document is primarily built for search engine 104 rather than for an end-user. Crawler 106 may further detect if the collected electronic document includes a hidden text and/or a hidden link, which often characterizes a search engine spam. Some other patterns characterizing a search engine spam include numerous unnecessary host names, excessive cross-links, link farming, etc. Based on an identified pattern of a collected electronic document, search engine 104 may generate a confidence level that the collected electronic document constitutes search engine spam.

Search engine 104 is further configured to access database 128 to extract information relating to one or more electronic documents collected by crawler 106. In one embodiment, search engine 104 obtains a list of network addresses stored in database 128. If search engine 104 determines that an obtained network address corresponds to a location of a collected electronic document, then it extracts a confidence level associated with this network address from database 128. Similarly, search engine 104 may obtain a list of host names from database 128 and determine if an obtained host name corresponds to a host name that provides a collected electronic document. If so, search engine 104 then extracts a confidence level associated with this obtained host name from database 128. In addition, search engine 104 may specify one or more electronic documents that are linked from an electronic document provided by this host name as having this confidence level. And for a term stored in database 128, search engine determines if this term appears in a collected electronic document. If the stored term appears in the collected electronic document, search engine then extracts a confidence level associated with this stored term from database 128.

Based on a confidence level determined by search engine 104 to indicate a likelihood that a collected electronic document constitutes a search engine spam and a confidence level of a network address, host name, and/or term associated with this collected electronic document, search engine 104 calculates a weighted rating for the collected electronic document. Specifically, the confidence level determined by search engine 104 during crawling of network 108 represents a likelihood that the collected electronic document is undesirable with respect to a search. And the confidence level(s) obtained from database 128 represents a likelihood that the collected electronic document is associated with an undesirable e-mail message (i.e., an e-mail spam). Because of the ownership connection between e-mail spam and search engine spam (i.e., a creator of an e-mail spam is likely to generate a search engine spam), search engine 104 may combine these two types of confidence levels to generate a weighted rating that indicates with high confidence whether the collected electronic document is a search engine spam.

As one particular way to determine with high confidence the combined likelihood that an electronic document constitutes a search engine spam, the various types of confidence levels are weighted-averaged to generate a rating. For example, if the electronic document has a 60% confidence level of being a search engine spam, a network address of the electronic document has an 80% confidence level of being associated with an e-mail spam, and a term appearing in the electronic document has a 70% confidence level of being associated with an e-mail spam, then search engine 104 may average these confidence levels to produce a rating of 70% for the electronic document. Alternatively, the rating of the electronic document may be a weighted average of a confidence level of being a search engine spam and a confidence level of being relating to an e-mail spam. Thus, in the example above, the confidence level of 80% that a network address of the electronic document is associated with an e-mail spam is weighted with the confidence level of 70% that a term appearing in the electronic document is associated with an e-mail spam to produce a 75% confidence level that the electronic document is relating to an e-mail spam. Search engine 104 then averages this weighted confidence level with the 60% confidence level of being a search engine spam to generate a rating of 67.5%, which indicates a weighted probability that the electronic document constitutes a search engine spam.

Alternatively, because these two different confidence levels use different mechanisms to decide if an electronic document is likely related to a spam, the combined likelihood that the electronic document constitutes a search engine spam may be higher than either type of the confidence levels. For example, if an electronic document has a 70% confidence of being a search engine spam and a network address of the electronic document has an 80% confidence level of being associated with an e-mail spam, then the combined likelihood that the electronic document constitutes a search engine spam may be 90%. Thus, by considering an electronic document's association with a possible e-mail spam, search engine 104 may accurately determine whether the electronic document is a search engine spam.

After search engine 104 determines that a particular electronic document constitutes a possible search engine spam (e.g., when the rating of the electronic document is greater than a threshold level), a query processor of search engine 104 may perform various actions to prevent presenting the electronic document to a user in a search result. Thus, based on a search request submitted by a user, the query processor may identify an electronic document determined to constitute a search engine spam as a "hit" of the submitted search request. In such a scenario, the query processor may demote the electronic document in a search result provided to the user. That is, the query processor of search engine 104 lowers a ranking of the electronic document in the search result because the electronic document constitutes a possible search engine spam. Alternatively, the query processor may remove the electronic document from the search result provided to the user. In one embodiment of the invention, the action taken by the query processor is tunable. That is, if it is more certain that an electronic document is a search engine spam, then the electronic document is subject to a heavier penalty. For instance, an electronic document with a rating greater than 85% may be removed from a search result provided to a user, while an electronic document with a rating between 65% and 85% may be demoted by 50 ranks in a search result. Moreover, an electronic document with a rating between 50% and 65% may be demoted by 25 ranks, while an electronic document with a rating below 50% would not receive a penalty. In another embodiment of the invention, if a preliminary ranking of an electronic document is higher than a predetermined rank (e.g., 5th rank), then the query processor preserves the ranking of the electronic document in a search result. That is, a highly relevant electronic document may receive no penalty even though it is determined to be a search engine spam.

Figure 2:
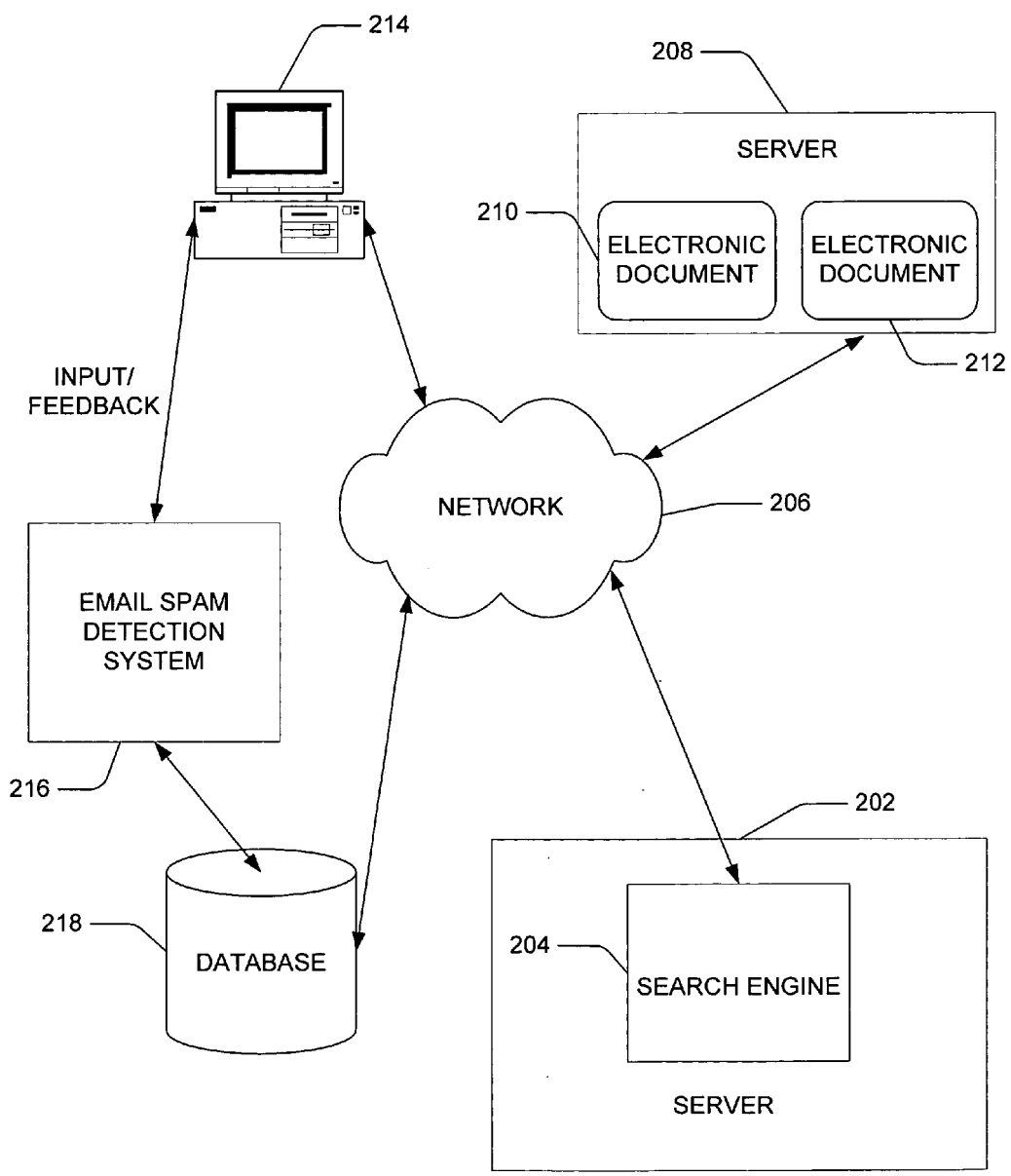
FIG. 2 is a block diagram illustrating another exemplary network environment in which embodiments of the present invention may be utilized.

Referring now to FIG. 2, a block diagram illustrates another example of a suitable network environment in which embodiments of the invention may be utilized. A server computer 202 includes a search engine 204. The server computer 202 is connected to a communications network 206, which further connects to a remote server computer 208. The communications network 206 may be a local area network such as an intranet, a wide area network such as the Internet, or a combination of networks that allow the server computer 202 to communicate with remote computers such as the remote server computer 208 either directly or indirectly. Remote server computer 208 provides an electronic document 210 and an electronic document 212, which may be a web page or a multimedia file. Additionally, remote server computer 208 is configured to transmit one or more e-mail messages to a user 214 via a computer connected to network 206.

After the user 214 receives an e-mail message from server computer 208, he or she identifies the received e-mail message as either an e-mail spam or a non-spam. User 214 then submits his or her identification of the received e-mail message as an input (or user-provided information generally) to an interface of an e-mail spam detection system 216. In response to receiving this input, the e-mail spam detection system 216 establishes a confidence level that this e-mail message is an e-mail spam. Furthermore, if system 216 receives multiple inputs for this e-mail message from multiple users, and if these inputs contradict with each other, then system 216 may decide not to establish a confidence level for the e-mail message. On the other hand, if the inputs agree with each other, then system 126 may establish a confidence level that the e-mail message constitutes an e-mail spam. In an alternatively embodiment of the invention, system 216 may implement a rule to judge one or more inputs. That is, certain inputs are weighted higher because users who submitted the inputs are more trustworthy. In this alternative embodiment, system 216 determines a percentage of users who report a particular e-mail message as an e-mail spam. If a majority of the users agree that the e-mail message is an e-mail spam, then the inputs from those in the minority may be trusted less. That is, if a particular user reports an e-mail message as an e-mail spam, and the majority of other users agree with this particular user, then system 216 may determine that this user is trustworthy. On the other hand, if the majority of other users do not agree with this particular user, then system 216 may determine that this user is not trustworthy. Accordingly, system 216 may determine a confidence level for an e-mail message based at least partially on the trustworthiness of a user-provided input.

If e-mail spam detection system 216 determines that a particular e-mail message constitutes an e-mail spam, then it parses the e-mail message to identify one or more attributes of the e-mail message to determine a pattern of the e-mail spam. If the e-mail message includes an image, then system 216 identifies the attributes by detecting a level of flesh tone in the image. In one embodiment, system 216 may identify one or more terms that are associated with this e-mail spam. Moreover, system 216 may determine a network address where the e-mail spam originates from (e.g., the network address of server computer 208). Also, system 216 may identify a host name associated with this e-mail spam. For example, if electronic document 210 and/or electronic document 212 are linked from the e-mail spam, system 216 may extract the host names of these electronic documents from the links. In another embodiment, system 216 stores the identified attributes relating to the e-mail spam in a memory area such as a database 216 connected to network 206.

The search engine 204 of server computer 202 accesses the database 217 to obtain the stored attributes. Based on the stored attributes, search engine 204 generates a rating for one or more electronic documents located at a particular network address or provided by a particular host name. Further, search engine 204 determines if a term stored in database 218 appears in a particular electronic document located on network 206 to generate a rating for the electronic document. The rating of an electronic document indicates a likelihood that the electronic document is a search engine spam. Search engine 204 then classifies the electronic document as a search engine spam if the rating of the electronic document exceeds a threshold level. A query processor of search engine 204 further performs an action to provide an accurate search result to a user (e.g., demoting the electronic document in the search result, removing the electronic document from the search result, etc.).

Figure 3:
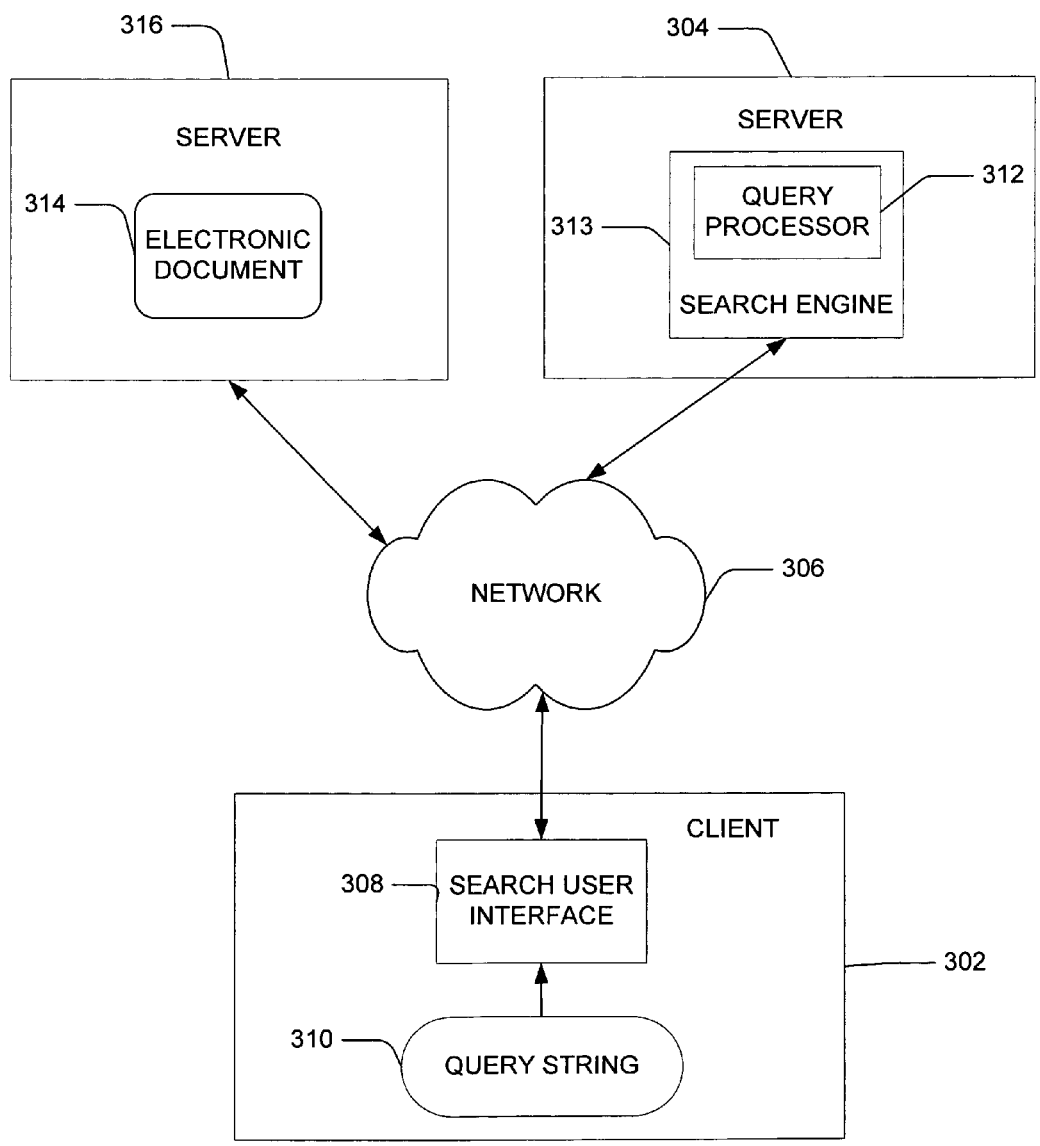
FIG. 3 is a block diagram illustrating yet another exemplary network environment in which embodiments of the present invention may be utilized.

Referring to FIG. 3, a block diagram illustrates yet another example of a suitable network environment in which embodiments of the invention may evaluate an electronic document in connection with a search. A client computer 302 is connected to a server computer 304 by a network 306. Again, the network 306 may be a local area network (e.g., an intranet), a wide area network (e.g., the Internet), or a combination of networks. The client computer 302 includes a search user interface 308 (e.g., a browser) or other machine-accessible programming interface or protocol that locates and displays electronic documents to a user.

When a user of client computer 302 desires to search for one or more electronic documents, he or she submits a query string 310 to the search user interface 308. After the user submits the query string 310, client computer 302 transmits query string 310 to a query processor 312 of a search engine 313 located at the server computer 304 to request a search. Based on the submitted query string 310, the query processor 312 identifies an electronic document 314 provided by a remote server computer 316 as a "hit" of the submitted query string 310. The remote server computer 316 is similarly connected to network 306. Query processor 312 then returns the electronic document 314 or a network location of electronic document 314 to search user interface 308 of client computer 302. After the user accesses the returned network location to obtain electronic document 314, he or she may identify electronic document 314 as either a search engine spam or a non-spam. The user then submits his or her identification as an input to the search engine 313.

In response to receiving this input, search engine 313 establishes a confidence level that electronic document 314 is a search engine spam. Furthermore, if search engine 313 receives multiple inputs for electronic document 314 from multiple users, and if these inputs contradict with each other, then search engine 313 may decide not to establish a confidence level for the electronic document 314. On the other hand, if the inputs agree with each other, then search engine 313 may establish a confidence level that electronic document 314 constitutes a search engine spam. In an alternatively embodiment of the invention, search engine 313 may implement a rule to judge one or more inputs. That is, certain inputs are weighted higher because users who submitted the inputs are more trustworthy. In this alternative embodiment, search engine 313 determines a percentage of users who report electronic document 314 as a search engine spam. If a majority of the users agree that electronic document 314 is a search engine spam, then the inputs from those in the minority may be trusted less. That is, if a particular user reports electronic document 314 as a search engine spam, and the majority of other users agree with this particular user, then search engine 313 may determine that this user is trustworthy. On the other hand, if the majority of other users do not agree with this particular user, then search engine 313 may determine that this user is not trustworthy. Accordingly, search engine 313 may determine a confidence level for a particular electronic document based at least partially on the trustworthiness of a user-provided input.

If this user-provided information identifies electronic document 314 as a search engine spam, then search engine 313 parses electronic document 314 to detect one or more attributes that characterize a search engine spam. If electronic document 314 includes an image, then search engine 313 detects the attributes by sensing a level of flesh tone in the image. Search engine 313 will identify one or more patterns of electronic document 314 to determine if these patterns correspond to a pattern characterizing a search engine spam. For example, search engine 313 may identify if electronic document 314 is primarily built for search engine 313 rather than for an end-user. Search engine 313 may further detect if electronic document 314 includes a hidden text and/or a hidden link, which often characterizes a search engine spam. Some other patterns characterizing a search engine spam include numerous unnecessary host names, excessive cross-links, link farming, etc.

Based on the identified patterns or attributes, search engine 313 generates a rating for electronic document 314. The rating of electronic document 314 indicates a likelihood that electronic document 314 is a search engine spam. Search engine 313 then classifies electronic document 314 as a search engine spam if the rating of electronic document 314 exceeds a threshold level. Query processor 312 further performs an action to provide an accurate search result to a user (e.g., demoting electronic document 314 in the search result, removing electronic document 314 from the search result, etc.).

Exemplary Method of Detecting an Undesired Electronic Document

Figure 4:
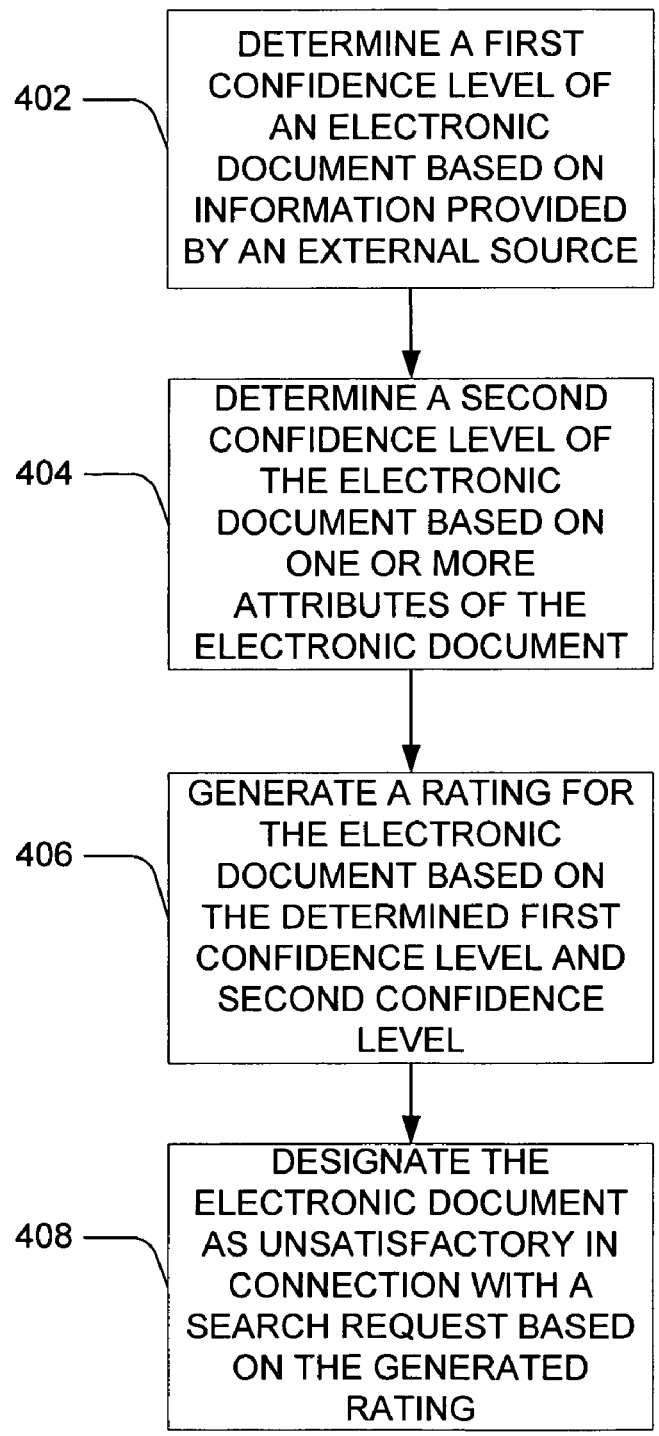
FIG. 4 is an exemplary flow diagram illustrating process flow according to one embodiment of the invention for evaluating an electronic document in connection with a search.

FIG. 4 illustrates an exemplary method for evaluating an electronic document in connection with a search according to one embodiment of the invention. At 402, a first confidence level of an electronic document is determined. The first electronic document is retrievable by a search engine in response to a search request from a user. The first confidence level indicates a likelihood that that the electronic document is undesirable based on information provided by a source external to the search engine. The external source may include an e-mail spam detection system that provides data regarding one or more electronic documents. For example, the external source may provide a host name that presents one or more electronic documents identified by the external source as having a predetermined likelihood of being undesirable. And an electronic document linked from these electronic documents may be specified the first confidence level. The external source may also provide a network address where one or more electronic documents with a predetermined likelihood of being undesirable are located. The external source may further provide a term that appears in one or more electronic documents having a predetermined likelihood of being undesirable. The first confidence level for the electronic document is determined based on the predetermined likelihood.

At 404, a second confidence level of the electronic document is determined. The second confidence level indicates a likelihood that the electronic document is unsatisfactory with respect to the search request based on one or more attributes of the electronic document. Such attributes, which characterize an undesirable pattern of the electronic document, are identified by parsing the electronic document. Alternatively, user-provided information with respect to the electronic document may be received. The user-provided information specifies the electronic document as undesirable in a search result. And accordingly, one or more attributes of the electronic document may then be identified to detect an undesirable pattern.

At 406, a rating is generated for the electronic document as a function of the determined first confidence level and the determined second confidence level. At 408, the electronic document is designated as unsatisfactory in connection with the search request based on the generated rating of the electronic document. Furthermore, a search result may be provided to the user in response to the search request from the user. If the electronic document is designated as unsatisfactory, it may be excluded from the provided search result. Alternatively, the electronic document may be demoted in the search result provided to the user. If a ranking of the electronic document exceeds a predetermined rank in the search result, then the ranking of the electronic document may be preserved.

Figure 5:
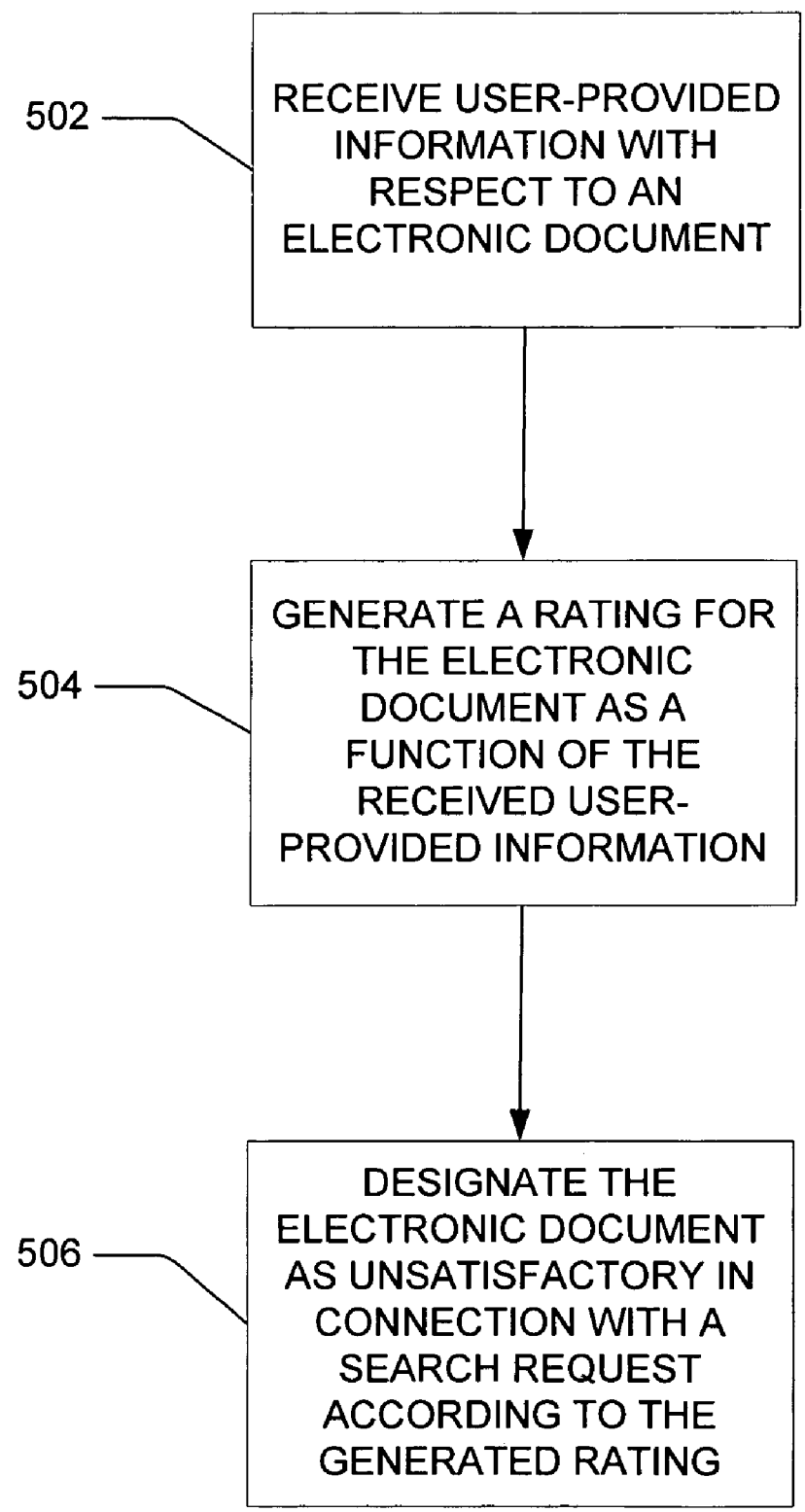
FIG. 5 is an exemplary flow diagram illustrating process flow according to one embodiment of the invention for evaluating an electronic document in connection with a search.

FIG. 5 illustrates another exemplary method for evaluating an electronic document in connection with a search according to one embodiment of the invention. At 502, user-provided information with respect to an electronic document is received. The electronic document is retrievable by a search engine in response to a search request from a user. This user-provided information characterizes the electronic document as undesirable. For example, the received user-provided information may specify that the electronic document is associated with an undesirable e-mail (e.g., a potential e-mail spam). Alternatively, the received user-provided information may specify that the electronic document is undesirable in a search result (e.g., a potential search engine spam). At 504, a rating is generated for the electronic document as a function of the received user-provided information. For instance, the electronic document that has been characterized as undesirable by the user-provided information may be parsed to identify one or more attributes of the electronic document. The identified attributes are then applied to a probabilistic classifier to generate a rating for the electronic document. The probabilistic classifier is trained to recognize whether the identified attributes are desirable and may be implemented as a Naïve Bayesian classifier, a limited dependence Bayesian classifier, a Bayesian network classifier, a decision tree, a support vector machine, a content matching classifier, a maximum entropy classifier, a combination thereof, and so on.

Moreover, trustworthiness of the received user-provided information may be determined. And the rating for the electronic document may be generated as a function of the determined trustworthiness. In one embodiment, other user-provided information with respect to the electronic document may be received. And the trustworthiness may be decided by determining if the other user-provided information corresponds with the received user-provided information. At 506, the electronic document is designated as unsatisfactory in connection with the search request according to the generated rating of the electronic document.

Exemplary Computer-Readable Medium

Figure 6:
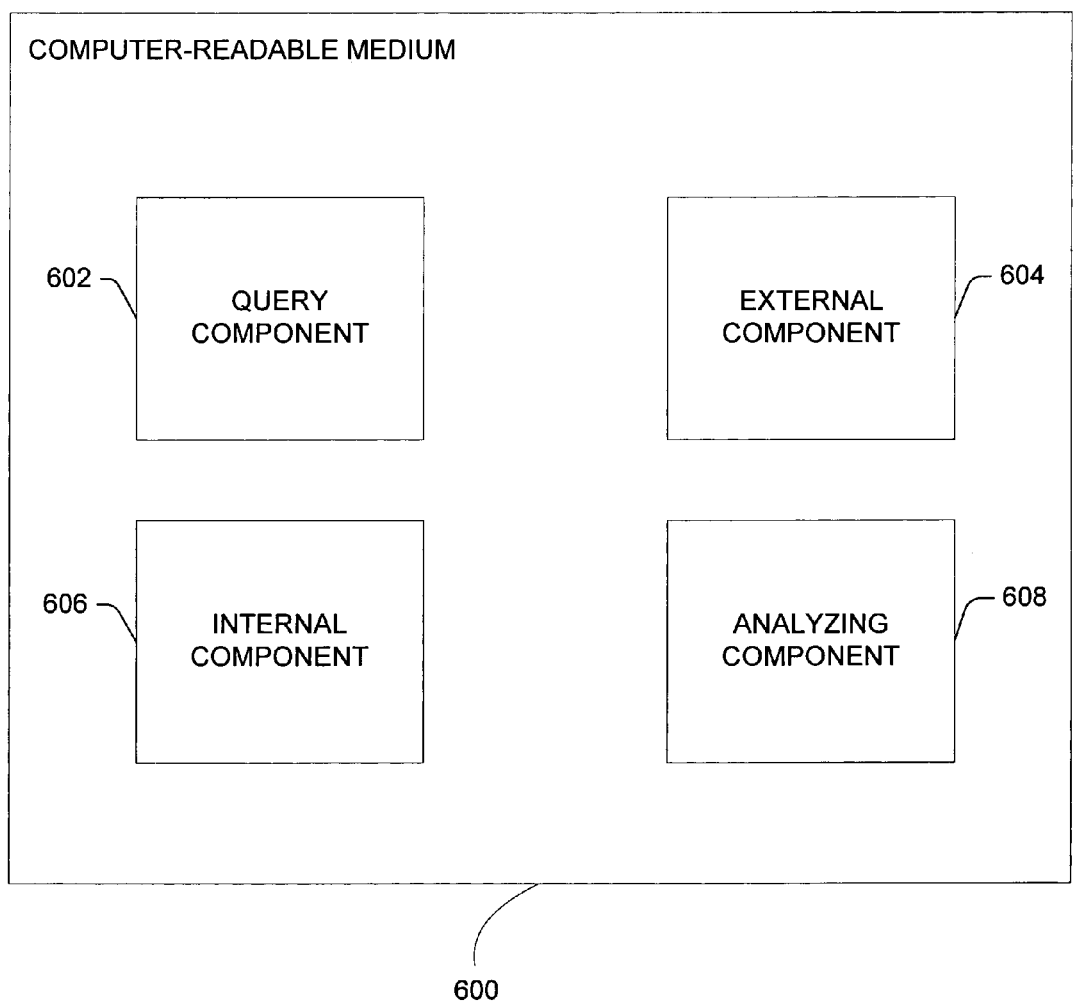
FIG. 6 is a block diagram illustrating an exemplary computer-readable medium according to one embodiment of the invention.

FIG. 6 is a block diagram illustrating an exemplary computer-readable medium 600 according to one embodiment of the invention. As shown, the computer-readable medium 600 includes a query component 602, an external component 604, an internal component 606, and an analyzing component 608. However, it is contemplated that computer-readable medium 600 may be any quantity of computer readable media and may comprise various combinations of components and functionalities associated with each component. The query component 602 receives a search request from a user and identifies an electronic document based on the received search request. The external component 604 provides data for use in evaluating whether the electronic document is undesirable. The internal component 606 is configured to determine a first confidence level of the electronic document. The first confidence level indicates a likelihood that the electronic document is undesirable based on the data provided by external component 604. For example, the data provided by external component 604 identifies one or more host names. Each of the host names provides information having a predetermined likelihood of being undesirable. Internal component 606 is configured to identify the electronic document as being provided by one of the provided names. And internal component 606 is further configured to specify the first confidence level, which is based on the predetermined likelihood, for the electronic document in response to identifying the electronic document as being provided by one of the host names.

Similarly, the data provided by external component 604 may identify one or more network addresses. External component 604 identifies one or more electronic documents located at one of the network addresses as having a predetermined likelihood of being undesirable. Internal component 606 is configured to identify the electronic document as being located at one of the network addresses. And internal component 606 is configured to specify the first confidence level, which is based on the predetermined likelihood, for the electronic document in response to identifying the electronic document as being located at one of the network addresses.

Furthermore, the data provided by external component 604 may identify one or more terms such that one or more electronic documents in which at least one of the terms appears have a predetermined likelihood of being undesirable. Internal component 606 is configured to determine when at least one of the terms appears in the electronic document. Internal component 606 is also configured to specify the first confidence level for the electronic document in response to determining that at least one of the terms appears in the electronic document. The first confidence level is based on the predetermined likelihood.

Internal component 606 also establishes a second confidence level of the electronic document. The second confidence level indicates a likelihood that the electronic document is unsatisfactory with respect to a search based on one or more attributes of the electronic document. Such attributes characterize an undesirable pattern of the electronic document with respect to the search.

The analyzing component 608 generates a rating for the electronic document as a function of the determined first confidence level and the established second confidence level. Query component 602 is configured to classify the electronic document as unsatisfactory in connection with the received search request based on the generated rating of the electronic document. Query component 608 also provides a search result to the user in response to the received search request. And query component 608 may demote the electronic document classified as unsatisfactory in the provided search result or exclude the electronic document classified as unsatisfactory from the provided search result. Alternatively, query component 608 may preserve a ranking of the electronic document in the provided search result when the ranking of the electronic document exceeds a predetermined rank in the provided search result.

Figure 7:
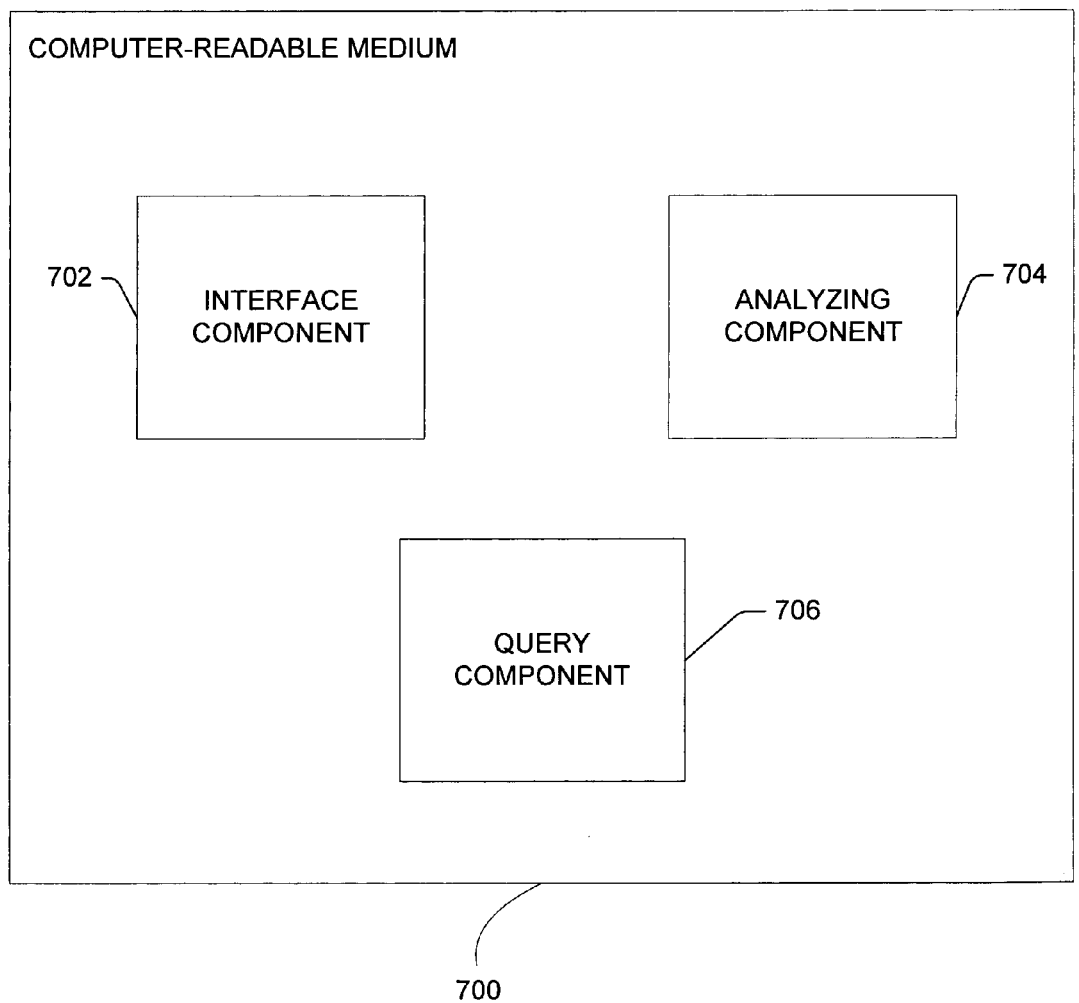
FIG. 7 is a block diagram illustrating another exemplary computer-readable medium according to one embodiment of the invention.

FIG. 7 is a block diagram illustrating another exemplary computer-readable medium 700 according to one embodiment of the invention. As shown, the computer-readable medium 700 includes interface component 702, an analyzing component 704, and a query component 706. However, it is contemplated that computer-readable medium 700 may be any quantity of computer readable media and may comprise various combinations of components and functionalities associated with each component. The interface component 702 receives user-provided information with respect to an electronic document. The electronic document is retrievable in response to a search request from a user. The user-provided information characterizes the electronic document as undesirable. For example, the received user-provided information may specify that the electronic document is associated with a source of an undesirable electronic mail.

The received user-provided information may also specify that the electronic document is undesirable in a search result.

The analyzing component 704 generates a rating for the electronic document as a function of the received user-provided information. In one embodiment, analyzing component 704 parses the electronic document to identify one or more attributes of the electronic document. Analyzing component 704 further applies the identified attributes to a probabilistic classifier, which is trained to recognize if the identified attributes are undesirable, to generate the rating for the electronic document. In another embodiment, analyzing component 704 determines trustworthiness of the received user-provided information and generates the rating for the electronic document as a function of the determined trustworthiness. For example, interface component 702 may receive other user-provided information with respect to the electronic document. Analyzing component 704 then examines if the other user-provided information corresponds to the received user-provided information to determine the trustworthiness of the received electronic document. After analyzing component 704 generates the rating for the electronic document, the query component 706 categorizes the electronic document as unsatisfactory in connection with the search request according to the generated rating of the electronic document.

Exemplary Operating Environment

Figure 8:
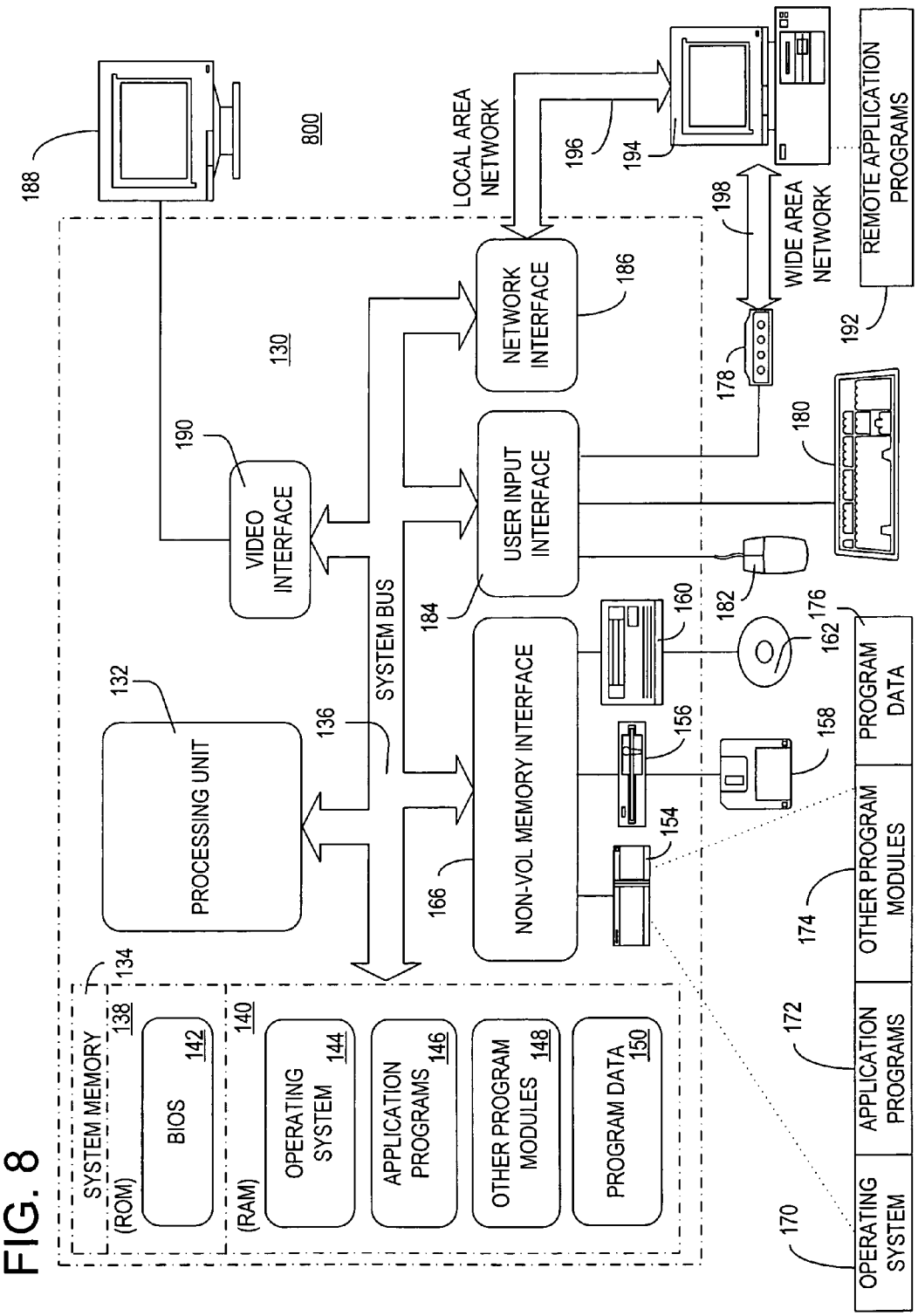
FIG. 8 is a block diagram illustrating an exemplary embodiment of a suitable computing system environment in which one embodiment of the invention may be implemented.

FIG. 8 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that may be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), including the basic routines that help to transfer information between elements within computer 130, such as during start-up, is typically stored in ROM 138. RAM 140 typically includes data and/or program modules that are immediately accessible to and/or presently being operated on by processing unit 132. By way of example, and not limitation, FIG. 8 illustrates operating system 144, application programs 146, other program modules 148, and program data 150.

The computer 130 may also include other removable/non-removable, volatile/nonvolatile computer storage media. For example, FIG. 8 illustrates a hard disk drive 154 that reads from or writes to non-removable, nonvolatile magnetic media. FIG. 8 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 8, provide storage of computer readable instructions, data structures, program modules and other data for the computer 130. In FIG. 8, for example, hard disk drive 154 is illustrated as storing operating system 170, application programs 172, other program modules 174, and program data 176. Note that these components may either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown)

such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 8 include a local area network (LAN) 196 and a wide area network (WAN) 198, but may also include other networks. LAN 136 and/or WAN 138 may be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 8 illustrates remote application programs 192 as residing on the memory device. The network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. Embodiments of the invention described herein include these and other various types of computer-readable storage media when such media include instructions or programs for implementing the steps described below in conjunction with a microprocessor or other data processor. One embodiment of the invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, one embodiment of the invention is operational with numerous other general purpose or special purpose computing system environments or configurations. The computing system environment is not intended to suggest any limitation as to the scope of use or functionality of embodiments of the invention. Moreover, the computing system environment should not be interpreted as having any dependency or requirement relating to any one or combination of components illustrated in the exemplary operating environment. Examples of well known computing systems, environments, and/or configurations that may be suitable for use with the embodiments of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Embodiments of the invention may also be practiced in distributed computing environments where tasks are performed by remote processing devices that are linked through a communications network. In a distributed computing environment, program modules may be located on both local and remote computer storage media including memory storage devices.

In operation, computer 130 executes computer-executable instructions such as those described herein to evaluate an electronic document in connection with a search. Computer-executable instructions are configured to determine a first confidence level of an electronic document. The electronic document is retrievable by a search engine in response to a search request from a user. The first confidence level indicates a likelihood that the electronic document is undesirable based on information provided by a source external to the search engine. Computer-executable instructions are also configured to determine a second confidence level of the electronic document. The second confidence level indicates a likelihood that the electronic document is unsatisfactory with respect to the search request based on one or more attributes of the electronic document. Computer-executable instructions are further configured to generate a rating for the electronic document as a function of the determined first confidence level and the determined second confidence level. Computer-executable instructions are also configured to designate the electronic document as unsatisfactory in connection with the search request based on the generated rating of the electronic document.

Computer 130 also executes computer-executable instructions such as those described herein to evaluate an electronic document in connection with a search. Computer-executable instructions are configured to receive user-provided information with respect to an electronic document. The electronic document is retrievable by a search engine in response to a search request from a user. The user-provided information characterizes the electronic document as undesirable. Computer-executable instructions are also configured to generate a rating for the electronic document as a function of the received user-provided information. Computer-executable instructions are further configured to designate the electronic document as unsatisfactory in connection with the search request according to the generated rating of the electronic document.

The order of execution or performance of the methods illustrated and described herein is not essential, unless otherwise specified. That is, it is contemplated by the inventors that elements of the methods may be performed in any order, unless otherwise specified, and that the methods may include more or less elements than those disclosed herein.

When introducing elements of the present invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of embodiments of the invention, it is intended that all matter contained in the above description and shown in the accompanying drawings shall be interpreted as illustrative and not in a limiting sense.

What is claimed is:

1. A method of evaluating an electronic document in connection with a search, said method comprising:
   parsing an electronic document to identify a first and a second attribute of the electronic document, said electronic document being retrievable by a search engine in response to a search request from a user and a determination by the search engine that the electronic document is relevant to the requested search, said first attribute corresponding to an electronic mail message attribute, said second attribute characterizing a pattern for manipulating a relevance determination of the electronic document with respect to the search request;
   receiving information from a source external to the search engine, said received information including the electronic mail message attribute relating to an undesirable electronic mail message;
   determining a first confidence level of the electronic document based on the first attribute of said electronic document, said first confidence level indicating a likelihood that the electronic document is associated with the undesirable electronic mail message;
   determining a second confidence level of the electronic document based on the second attribute of said electronic document, said second confidence level indicating a likelihood that the electronic document is unsatisfactory with respect to the search request;
   generating a rating for the electronic document as a function of the determined first confidence level and the determined second confidence level; and
   designating the electronic document as unsatisfactory in connection with the search request based on the generated rating of the electronic document.

2. The method of claim 1, wherein said external source comprises an electronic mail spam detection system.

3. The method of claim 1, wherein said electronic document comprises one or more of the following: a web page and a multimedia file.

4. The method of claim 1, further comprising specifying the first confidence level for one or more other electronic documents linked from the electronic document.

5. The method of claim 1, wherein parsing the electronic document is responsive to
   receiving user-provided information with respect to the electronic document, said received user-provided information specifying the electronic document as undesirable in a search result.

6. The method of claim 1, further comprising:
   providing a search result to the user in response to the received search request; and
   performing one or more of the following: demoting the electronic document designated as unsatisfactory in the provided search result, excluding the electronic document designated as unsatisfactory from the provided search result, and preserving a ranking of the electronic document in the provided search result when the ranking of the electronic document exceeds a predetermined rank in the provided search result.

7. The method of claim 1, wherein one or more computer-readable media have computer-executable instructions for performing the method recited in claim 1.

8. A system for evaluating an electronic document in connection with a search, said system comprising:
   a processor for receiving a search request from a user and for identifying an electronic document based on a determination that the electronic document is relevant to the received search request;
   a memory area storing data provided by a source external to the processor, said data including an electronic mail message attribute relating to an undesirable electronic mail message;
   said processor being configured to parse the electronic document to identify a first and a second attribute of the electronic document, said first attribute corresponding to the electronic mail message attribute, said second attribute characterizing a pattern for manipulating a relevance determination of the electronic document with respect to the search request;
   said processor being further configured to determine a first confidence level of the electronic document based on the first attribute of said electronic document, said first confidence level indicating a likelihood that the electronic document is associated with an undesirable electronic mail message;
   said processor being further configured to establish a second confidence level of the electronic document based on the second attribute of the electronic document, said second confidence level indicating a likelihood that the electronic document is unsatisfactory with respect to a search based on one or more attributes of the electronic document;
   said processor being further configured to generate a rating for the electronic document as a function of the determined first confidence level and the established second confidence level and to categorize the electronic document as unsatisfactory in connection with the received search request based on the generated rating of the electronic document.

9. The system of claim 8, wherein said external source comprises an electronic mail spam detection system.

10. The system of claim 8, wherein the processor is configured to provide a search result to the user in response to the received search request and to perform one or more of the following: demoting the electronic document categorized as unsatisfactory in the provided search result, excluding the electronic document categorized as unsatisfactory from the provided search result, and preserving a ranking of the electronic document in the provided search result when the ranking of the electronic document exceeds a predetermined rank in the provided search result.

11. One or more computer volatile or nonvolatile media having computer-executable components for evaluating an electronic document in connection with a search, said computer-readable media comprising:
   a query component to receive a search request from a user and to identify an electronic document based on a determination that the electronic document is relevant to the received search request;
   an external component to provide data, said data including an electronic mail message attribute relating to an for use in evaluating whether the electronic document is undesirable electronic mail message;

an internal component configured to:
    parse the electronic document to identify a first and a second attribute of the electronic document, said first attribute corresponding to the electronic mail message attribute, said second attribute characterizing a pattern for manipulating a relevance determination of the electronic document with respect to the search request;
    determine a first confidence level of the electronic document based on the first attribute of said electronic document, said first confidence level indicating a likelihood that the electronic document is associated with an undesirable electronic mail message; and
    establish a second confidence level of the electronic document based on the second attribute of the electronic document, said second confidence level indicating a likelihood that the electronic document is unsatisfactory with respect to a search based on one or more attributes of the electronic document;
an analyzing component to generate a rating for the electronic document as a function of the determined first confidence level and the established second confidence level; and
wherein the query component is configured to classify the electronic document as unsatisfactory in connection with the received search request based on the generated rating of the electronic document.

12. The computer-readable media of claim 11, wherein the query component is configured to provide a search result to the user in response to the received search request and to perform one or more of the following: demoting the electronic document classified as unsatisfactory in the provided search result, excluding the electronic document classified as unsatisfactory from the provided search result, and preserving a ranking of the electronic document in the provided search result when the ranking of the electronic document exceeds a predetermined rank in the provided search result.

13. The method of claim 1 wherein the received information further includes a predetermined likelihood that the electronic mail message attribute is associated with the undesirable electronic mail message and wherein the first confidence is based on said predetermined likelihood.

14. The method of claim 13 wherein the electronic mail message attribute is a host name and the first attribute of the electronic document corresponds to said host name indicating that the electronic document is provided by said host name.

15. The method of claim 13 wherein the electronic mail message attribute is a network address and the first attribute of the electronic document corresponds to said network address indicating that the electronic document is located at said network address.

16. The method of claim 13 wherein the electronic mail message attribute is one or more terms and the first attribute of the electronic document corresponds to said one or more terms.

17. The method of claim 1 wherein the electronic attribute is identified by the external source in response to receiving user-provided information specifying as undesirable the electronic mail message related to the electronic mail message attribute.

18. The system of claim 8 wherein the data provided by the external source further includes a predetermined likelihood that the electronic mail message attribute is associated with an undesirable electronic mail message and wherein the first confidence level is based on said predetermined likelihood.

19. The system of claim 18 wherein the electronic mail message attribute is a host name and the first attribute of the electronic document corresponds to said host name indicating that the electronic document is provided by said host name.

20. The system of claim 18 wherein the electronic mail message attribute is a network address and the first attribute of the electronic document corresponds to said network address indicating that the electronic document is located at said network address.

21. The method of claim 18 wherein the electronic mail message attribute is one or more terms and the first attribute of the electronic document corresponds to said one or more terms.

22. The computer-readable media of claim 11, wherein the data provided by the external component further includes a predetermined likelihood that the electronic mail message attribute is associated with an undesirable electronic mail message and wherein the first confidence level is based on said predetermined likelihood.

23. The computer-readable media of claim 22 wherein the electronic mail message attribute is a host name and the first attribute of the electronic document corresponds to said host name indicating that the electronic document is provided by said host name.

24. The computer-readable media of claim 22 wherein the electronic mail message attribute is a network address and the first attribute of the electronic document corresponds to said network address indicating that the electronic document is located at said network address.

25. The computer-readable media of claim 22 wherein the electronic mail message attribute is one or more terms and the first attribute of the electronic document corresponds to said one or more terms.

* * * * *